(12) United States Patent
Ching

(10) Patent No.: US 6,533,168 B1
(45) Date of Patent: Mar. 18, 2003

(54) METHOD AND APPARATUS FOR COMPUTER-READABLE PURCHASE RECEIPTS USING MULTI-DIMENSIONAL BAR CODES

(76) Inventor: Peter N. Ching, P.O. Box 513, Tustin, CA (US) 92781

( * ) Notice: Subject to any disclaimer, the term of this patent is extended or adjusted under 35 U.S.C. 154(b) by 0 days.

(21) Appl. No.: 09/579,446

(22) Filed: May 26, 2000

Related U.S. Application Data

(60) Provisional application No. 60/136,642, filed on May 27, 1999.

(51) Int. Cl.[7] ............................................... G06F 17/00
(52) U.S. Cl. ....................................... 235/375; 235/436
(58) Field of Search ................................. 235/381, 382, 235/375, 380, 492, 493, 449, 462.01–462.25, 436, 472.01, 472.02, 472.03, 435

(56) References Cited

U.S. PATENT DOCUMENTS

| | | | | |
|---|---|---|---|---|
| 4,114,027 A | * | 9/1978 | Slater et al. ................ | 235/419 |
| 4,251,798 A | | 2/1981 | Swartz et al. | |
| 4,360,798 A | | 11/1982 | Swartz et al. | |
| 4,369,361 A | | 1/1983 | Swartz et al. | |
| 4,387,297 A | | 6/1983 | Swartz et al. | |
| 4,409,470 A | | 10/1983 | Shepard et al. | |
| 4,460,120 A | | 7/1984 | Shepard et al. | |
| 4,970,655 A | * | 11/1990 | Winn et al. .................. | 364/479 |
| 5,202,552 A | | 4/1993 | Little et al. | |
| 5,304,786 A | | 4/1994 | Pavlidis et al. | |
| 5,319,181 A | | 6/1994 | Shellhammer et al. | |
| 5,331,176 A | | 7/1994 | Sant' Anselmo et al. | |
| 5,581,630 A | * | 12/1996 | Bonneau, Jr. ................ | 382/116 |
| 5,591,956 A | | 1/1997 | Longacre et al. | |
| 5,613,783 A | * | 3/1997 | Kinney et al. ................ | 400/73 |
| 5,739,512 A | | 4/1998 | Tognazzini | |
| 5,773,806 A | | 6/1998 | Longacre, Jr. | |
| 6,073,118 A | * | 6/2000 | Gormish et al. .............. | 705/39 |
| 6,247,645 B1 | * | 6/2001 | Harris et al. ................. | 235/454 |
| 6,305,604 B1 | * | 10/2001 | Ono ............................. | 238/380 |
| 2001/0025341 A1 | * | 9/2001 | Marshall ...................... | 713/176 |

FOREIGN PATENT DOCUMENTS

| | | | | |
|---|---|---|---|---|
| JP | | 359194261 A | * | 11/1984 |
| WO | | WO009856589 A1 | * | 12/1998 |

* cited by examiner

Primary Examiner—Thien M. Le
(74) Attorney, Agent, or Firm—Gazdzinski & Associates

(57) ABSTRACT

An information entry and reporting system and method for tracking data associated with retail transactions at the point of sale. Transaction data is converted into a machine readable dataform pattern and printed onto a sales receipt provided to the purchaser. Subsequently, the purchaser uses a suitably configured scanning device to read the dataform pattern into his or her computer. Software algorithms decode the scanned dataform pattern, extract the transaction data and store it for subsequent analysis and reporting. The system includes a computer, software adapted to retrieve selected data, assemble the retrieved data in a format suitable for encoding and encode the data in a dataform pattern, a printer to print the encoded transaction data, a scanning device to capture the encoded data, software to decode the transaction data and software to display the data in human readable form.

36 Claims, 12 Drawing Sheets

METHOD AND APPARATUS FOR COMPUTER-READABLE PURCHASE RECEIPTS USING MULTI-DIMENSIONAL BAR CODES

This application claims priority benefit to U.S. provisional patent application Ser. No. 60/136,642 filed May 27, 1999 and entitled "Method And Apparatus For Computer-Readable Purchase Receipts Using Multi-Dimensional Bar Codes", which is incorporated herein by reference in its entirety.

FIELD OF THE INVENTION

The present invention relates to data entry and reporting systems and more specifically, to a method of employing machine-readable dataforms to automate transmission of transaction data from vendor point of sale transaction registers to purchaser data processing devices such as computers.

DESCRIPTION OF THE RELATED TECHNOLOGY

Computer based storage, analysis and reporting of transaction data offers powerful analytical tools with applications in both personal and business contexts. A key challenge to full exploitation of these analytical and reporting tools is accurate and timely entry of transaction data and associated categories into user data processing devices such as computers, personal digital assistants (PDAs), hand-held PCs, or even cellular telephones.

In a retail transaction at the point of sale, transaction data, including the currency value of the transaction, the time and date of the transaction, and the items or services transacted, are typically entered by a vendor into a cash register or other transaction processing device (hereinafter "cash register"), either manually or by use of an automated data entry device. The cash register creates a record of the sale for the vendor's accounting system.

The cash register also prints the previously entered transaction data combined with vendor configurable information such as the name, address and telephone number of the vendor onto a tangible (e.g., paper) register receipt. This receipt is then provided to the purchaser as a record of the transaction. For various reasons including, inter alia, tax reporting or expense reimbursement claims purposes, purchasers will often add their own handwritten notations regarding the circumstances of the transaction to the receipts after receiving the receipt from the vendor.

Typically, in order to enter this information into their own computer, the purchaser must duplicate the vendor's original data entry efforts. This entry process requires re-entry of the transaction data and is commonly accomplished by means of manual entry of the transaction data, including any handwritten notations on the receipts, using a keyboard attached to the purchaser's computer.

This method presents several obvious problems. The data entry is itself time consuming and labor intensive. Data entry errors can occur either while the purchaser is reading the transaction data from the receipts or while the transaction data is subsequently being entered using the keyboard. The time, effort and monotony associated with hand keying receipt information into the purchaser's computer means that purchasers often will delay or simply fail to enter the receipts. Among other problems, this can result in loss of the receipts and/or incomplete purchaser transaction records.

Dataform Technology

So-called "barcodes" are well known in the data encoding arts. Linear barcodes (also known as one-dimensional barcodes), stacked barcodes (also known as one-dimensional stacked or two-dimensional stacked barcodes), matrix barcodes (also known as two-dimensional matrix barcodes) and any other arrangement whereby data is fixed in some form of machine readable copy (collectively "dataforms"), are machine readable graphical patterns of encoded data within a matrix which typically incorporate graphical finder, orientation and reference structures. Dataforms are often printed on paper or other suitable substrates. They are functionally non-volatile "write once read many" storage for recording and transmission of data. They typically take the form of dark colored elements printed on a substrate, the latter providing a light colored background. The specific pattern of dark and light areas communicates encoded data and varies depending on the specific encoding symbology used. These patterns can be subsequently read by use of an electro-optical scanning device or other suitable devices which are capable of distinguishing between different reflective values of light reflected from the dark and light elements of the dataform. The variations in reflected light are photoelectrically converted into electrical signals which are in turn amplified and digitized. The digitized information representing the encoded pattern is then processed to reveal the dataform pattern. The dataform pattern is then decoded by use of an algorithm, such decoding allowing extraction of the encoded data.

Data storage capacities among dataforms vary based on a number of factors including encoding symbology and size of the dataform. For example, as compared with stacked and matrix barcodes, linear barcodes, have a limited capacity to store information. In contrast, stacked and matrix barcodes offer greatly expanded data storage capacity. Where linear barcodes generally contain a string of numbers functioning as a record locator referencing an external database, stacked and matrix barcodes can themselves function as self-contained databases. Examples of dataform encoding symbologies are disclosed in, for example, U.S. Pat. Nos. 5,304,786 (Pavlidis, et al.); 5,591,956 (Longacre, et al.) and U.S. Pat. No. 5,202,552 (Little, et al). Other dataform encoding symbologies include the United Parcel Service's MaxiCode 2D matrix barcode, Ted William's Code One matrix barcode, and International DataMatrix, Inc.'s DataMatrix 2D matrix barcode.

As compared with read-only memory based on electronic storage mediums, dataforms, being encoded patterns printed onto paper or other suitable substrates, provide other advantages. They commonly incorporate error correction protocols, thereby allowing damaged or partial images to communicate the required data. They are also comparatively cheap to produce, have no power requirements for maintaining the integrity of their encoded data, are very convenient to transport and store and as compared with electro-mechanical based storage methods, are very durable.

U.S. Pat. No. 5,739,512 entitled "Digital Delivery of Receipts" issued Apr. 14, 1998 and assigned to Sun Microsystems, Inc., (hereinafter "the '512 patent") discloses a method and apparatus for transmitting electronic receipts via a variety of mechanisms including e-mail and "smart" cards. However, while affording advantages in terms of ease and speed of routing of information to its desired destination, the invention disclosed in the '512 patent disadvantageously does not allow the user to make annotations upon the receipt generated by the vendor. Additionally, no facility for automatically identifying and storing encoded transaction information based on classification codes provided by the vendor or the purchaser is disclosed. Furthermore, no method for transmitting the transaction data via means other than smart cards or the Internet is disclosed. In particular, no method for transmitting transaction data to Personal Digital Assistants (PDAS) is disclosed. Additionally, no facility for allowing the user to characterize or annotate stored transaction information at the time of transaction is disclosed.

Based on the foregoing, what is needed is an improved method and apparatus for communicating information relating to transactions, including user-customized or annotated data, from the point of occurrence of the transaction (e.g., the point of sale) to a data processing device accessible by the user via one or more communications links. Such improved method and apparatus would ideally allow the transmission of a variety of different types of information, including transaction details and transaction classification codes, directly or indirectly to one or more data processing devices, thereby obviating the need for manual entry of the information by the purchaser. Furthermore, such method and apparatus would ideally not require both the vendor and the purchaser to be connected to the communications link(s) at the same time, and would be compatible with a variety of different hardware and software environments. Such method and apparatus would also robust from a data error perspective, and would be cost effective to implement.

SUMMARY OF THE INVENTION

The present invention addresses the foregoing needs by providing an improved method and apparatus communicating transaction-related information of various types across a communications link to one or more data processing devices.

In a first aspect of the invention, a system which encodes transaction data in the form of a dataform printed directly onto receipts provided to purchasers is disclosed. In one exemplary embodiment, the system comprises a data processing device with data storage capability operatively connected to a cash register or other device capable of providing transaction data; a computer program running on the data processing device and adapted to encode the transaction data at the point of sale into a dataform pattern; and a printing device capable of printing the dataform pattern onto a receipt. The dataform pattern comprises an encoded dataform containing a plurality of transaction-related data, and the receipt comprises a paper receipt or other tangible substrate capable of fixedly receiving the dataform thereon. The encoded data may then be read and decoded by the purchaser at a later time and/or remote location. In a second embodiment, the system includes a data interface to a portable device, such as a wireless radio frequency (RF) interface or data cable, and the encoded transaction data is transmitted via the interface to the portable device for storage and later retrieval therein. In a third embodiment, the encoded data is transmitted via one or more communications links to a remote server where it is stored in a database, which the vendor and/or purchaser may subsequently access in order to retrieve and utilize the transaction data.

In a second aspect of the invention, a system for encoding transaction data in the form of a dataform on a receipt, and subsequently decoding and storing the encoded data in a remote database is disclosed. In one exemplary embodiment, the system comprises a data processing device operatively connected to a cash register or other device capable of providing transaction data; a computer program running on the data processing device and adapted to encode the transaction data at the point of sale into a dataform pattern; a printing device capable of printing the dataform pattern onto a receipt; a scanning device capable of reading the aforementioned dataform pattern from the receipt; and a decoding device operatively coupled to the scanning device adapted to derive the encoded and categorized transaction data from the read dataform. A data processing device capable of mapping the decoded transaction data to a computer database is also used in conjunction with the system. In a second embodiment, the system includes optical character recognition (OCR) or comparable software operatively coupled to the decoding device for recognizing and decoding annotations (such as handwritten notes or symbols) made directly on the tangible receipt. The decoded annotations are then stored within the aforementioned database according to predetermined relationships specified, for example, by the user. In yet another embodiment, the scanning device scans and stores the entire receipt as a single image. Through recognition of unique identifier symbols, the dataform pattern is identified as one component of the scanned image and is decoded and processed as described above. The scanned image is retained as a discrete file and is marked with an indexing identifier relating it to the characterized transaction data that was decoded from the dataform.

In a third aspect of the invention, an improved method of encoding transaction data in the form of a dataform provided with a purchase receipt is disclosed. In one exemplary embodiment, the method comprises: entering transaction data including the time/date and value of the transaction into one or more specified data fields adapted for such data; categorizing the transaction data according to at least one predetermined classification; encoding the transaction data at the point of sale into one or more dataform patterns; and printing the dataform pattern onto a receipt, whereby the dataform is adapted to be scanned and read by a scanning device. In the case of a credit card transaction or if the vendor employs a check verification system, additional transaction data related to these functions is optionally entered and encoded on the receipt, either by manual entry, or via electronic data transfer.

In a fourth aspect of the invention, an improved method of communicating transaction data in the form of a dataform using a purchase receipt is disclosed. In one exemplary embodiment, the method comprises: entering and categorizing the transaction data, using an algorithm executed by a processor equipped device to encode the transaction data at the point of sale into a dataform pattern; printing the dataform pattern onto a receipt; reading the dataform pattern on the receipt with a scanning device; decoding the dataform pattern to derive the encoded and categorized transaction data; and mapping the decoded transaction data to a computer database. The information in the database is made available for use by entities or processes such as software applications. In a second embodiment, annotations made by the user directly on the receipt are scanned and decoded by the scanning device along with the dataform(s). Optical character recognition (OCR) or similar software is utilized to recognize and decode the user's annotations. The decoded annotations are then converted to text and subsequently stored within the database.

In a fifth aspect of the invention, an improved scanning device useful for scanning transaction dataforms is disclosed. In one exemplary embodiment, the scanning device generally comprises a light source, light signal detection device, microprocessor, storage device(s) such as a random access memory (RAM) and/or read-only memory (ROM), analog-to-digital converter (ADC), and a digital signal processor (DSP). A series of feed/drive rollers control the propagation of the receipt with dataform through the scanning device and past the light source and detection device. The light reflected from the dataform comprises a signal which is passed through an aperture and detected by the detection device, which generates an output signal to a signal amplifier which is in turn connected to the ADC. The scanning device is further connected to a data processing device which allows further processing of the detected light signal.

These and other objects, advantages and features of the invention will become better understood from a detailed description of the preferred embodiment which is described in conjunction with the accompanying drawings.

BRIEF DESCRIPTION OF THE DRAWINGS

FIG. 1b is a logical block diagram of the transaction data encoding and decoding system of FIG. 1a.

FIG. 2b is logical block diagram of the transaction data reading and decoding apparatus of FIG. 2a.

DETAILED DESCRIPTION OF THE INVENTION

Reference is now made to the drawings wherein like numerals refer to like parts throughout.

As used herein, the term "data processing device" will be understood to include any device capable of processing digital data, including, inter alia, personal computers (PCs), whether desktop, laptop, or otherwise, PDAs such as the well known "Palm™" series manufactured by Palm Corporation, so-called "hand-held" PCs such as the HPW-600ET "ePlate" incorporating Microsoft Windows CE manufactured by Hitachi Corporation, cellular telephones, and "smart" pagers. Also included within the scope of the term "data processing device" are such devices as network servers, minicomputers (including, for example the SPARC series of minicomputers manufactured by Sun Microsystems Corporation), and any other non-personal computing device.

As described in greater detail below, one embodiment of the present invention comprises an interface to a data network having at least two different nodes and at least one server each operatively connected to the Internet, although it will be appreciated that other configurations having more or less nodes, architectures, and/or servers may be employed consistent with the invention. Hence, the term "computer network" as used herein may include, but is not limited to, local-area networks (LAN), wide-area networks (WAN), intranets, the Internet, and may utilize any topology, protocol, or physical medium for communication including Ethernet, X.25, token ring, frame relay, ATM, SONET. Hence, as used herein, the term "computer network" is meant in its broadest sense to include any type of network capable of transmitting digital data between users.

Figure 1A:
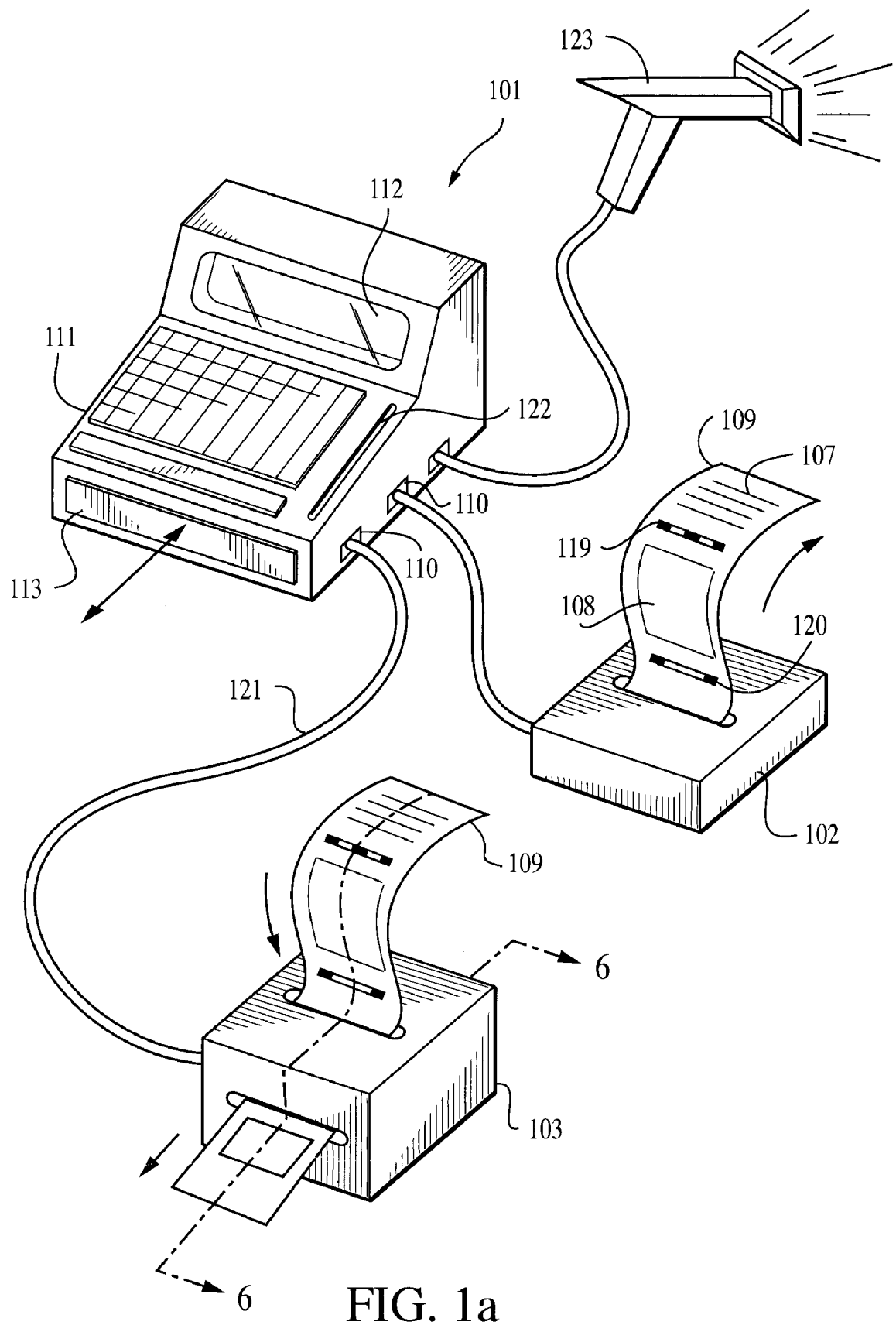
FIG. 1a is a perspective view of one exemplary embodiment of the transaction data encoding and decoding system of the present invention.
Figure 1B:
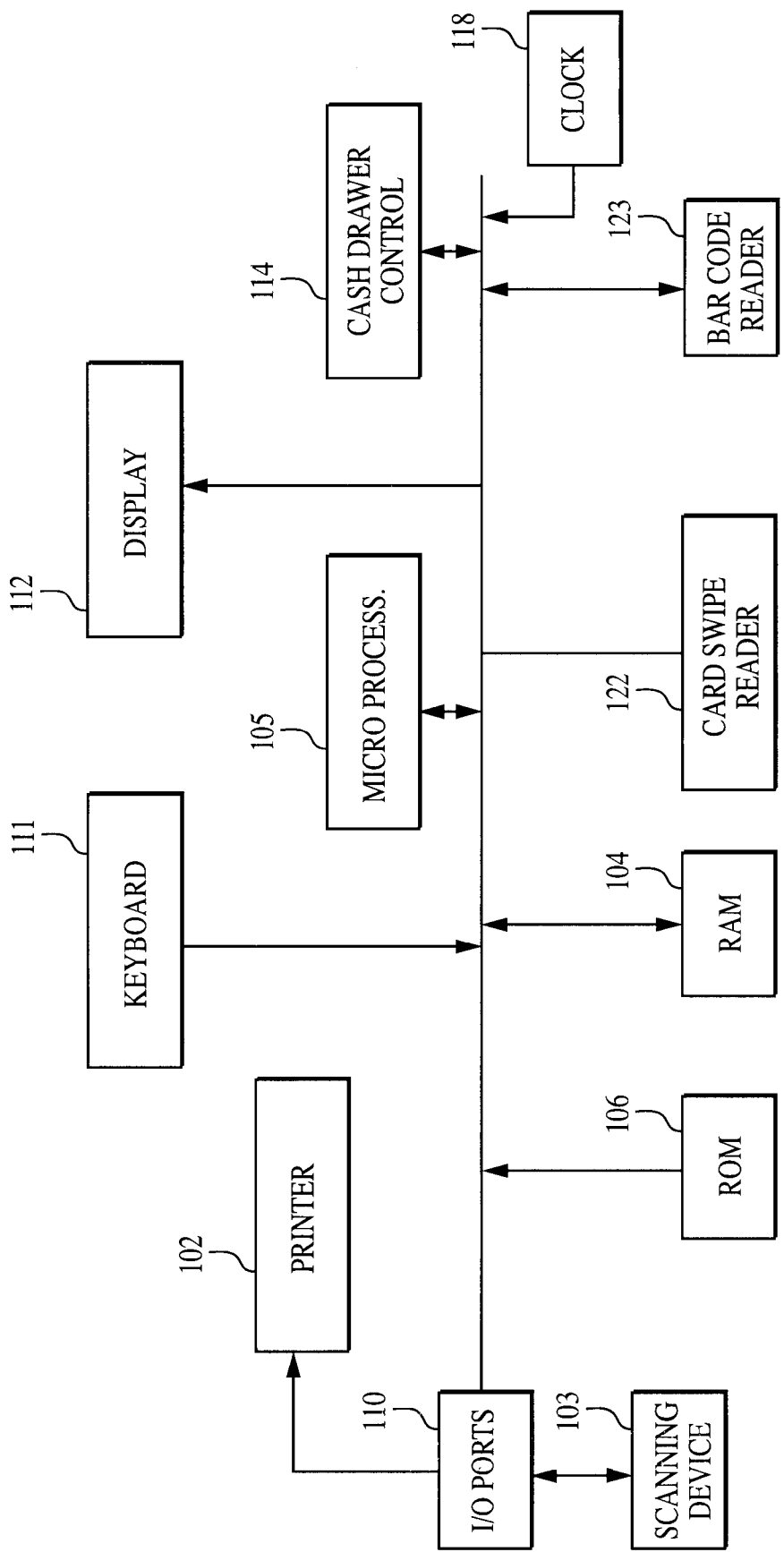

Referring now to FIG. 1a and FIG. 1b, one exemplary embodiment of the transaction data encoding system 100 of the invention is described. A cash register 101 is connected to an electro-optical scanning device 103 capable of reading a dataform 115 and a printer 102 having sufficient print resolution to print a receipt 109 containing, inter alia, a human readable information set 107, a machine readable dataform 108, a designated area for handwritten notations 304, an "attention" symbol 119 and an "endsearch" symbol 120. The cash register 101 incorporates, among other equipment, a random access memory ("RAM") 104, a microprocessor 105, a read only memory ("ROM") 106, input-output data ports ("I/O Ports") 110, a keyboard 111, a display 112, a cash drawer 113 controlled by a cash drawer control 114, a clock 118 and a card swipe reader 122. The construction and operation of microprocessor-based cash registers having the aforementioned components is well understood, and accordingly is not described further herein. In the embodiment of FIG. 1, the cash register 101, the scanning device 103 and the printer 102 are linked by serial connections 121, although it will be recognized that other types of data connections including parallel connections, IEEE-1394 "Firewire", or even infrared or wireless interfaces may be substituted. Furthermore, while the scanning device 103 and printer 102 are external to the cash register 101 in the illustrated embodiment, two or more of such components may in fact be physically integrated into one device.

At the time of the transaction, by means of a keyboard 111, a card swipe reader 122, a bar code reader 123 or other data entry device, a vendor enters transaction information such as, for example: (i) a brief description of each good or service being transacted (including, if required, the product identification number assigned to each good or service transacted); (ii) a numerical value reflecting the number of each type of good or service being transacted; (iii) a numerical value reflecting the price for each good or service being transacted; (iv) a numerical value reflecting the subtotal of the goods or services being transacted; (v) a numerical value reflecting the sales tax amount, if applicable, on the goods and services being transacted; (vi) a numerical value reflecting the total amount of the transaction; (vii) a description of the method of payment made by the purchaser; and/or (viii) a unique transaction record locator number, providing a reference for retrieval of the transaction data from the vendor's database.

If the purchaser pays for the purchase with a credit card or debit card, or if the vendor employs a check verification service, additional transaction information will be included such as, for example a purchaser's credit/debit card (account) number, the expiration date of the credit/debit card, and/or an authorization code provided by the credit card company, check verification company or other authorizing financial institution for authorization of transactions against the account.

Additional vendor required information is also passed to the RAM 104. As each piece of transaction information is either entered by the vendor or received from a data source, a computer program stored on the ROM 106 and/or RAM 104 and executed on the microprocessor 105 coordinates the vendor's entry of transaction information so that each piece of information is characterized according to a predefined set of categories such as, for example: Item Identification Information; Unit Price; Subtotal Price; Sales Tax; Total Price; Card Number; Expiration Date; Authorization Code; Vendor Name; Vendor Address; Vendor Telephone Number; Transaction Date; Transaction Time and Vendor Database Record Locator. The characterization of the information is either determined by the order in which it is entered (i.e. the system expects that the first piece of data entered will be the Item Identification Information, the second piece of data the Unit Price and so on) or the user is prompted to enter the data in a certain sequence (i.e. the prompt "Unit Price?" is displayed and then the data entered in response is characterized as Unit Price data, etc.).

Based on these characterizations, an algorithm stored on the ROM 106 or RAM 104 assigns the discrete pieces of transaction information to designated temporary locations in the RAM 104 that correspond to the various characterization categories.

The microprocessor 105 in the cash register 101 executing software stored in the ROM 106 or RAM 104, creates a transaction dataset (not shown) by combining all of the transaction information stored in the RAM 104 and the associated characterization information. Note that for any vendor-purchaser transaction, only transaction information corresponding to one discrete transaction is encoded into each transaction dataset. The microprocessor 105 then executes software stored in the ROM 106 or RAM 104 incorporating dataform encoding algorithms (referenced below) and encodes the transaction dataset (not shown) into a dataform pattern 108.

There are a number of dataform encoding symbologies well known to those skilled in the art that can be used to encode the transaction dataset consistent with the present invention. Examples of encoding symbologies include, but are not limited to, the well known "Code One," "DataMatrix," "MaxiCode," "PDF417" (disclosed in U.S. Pat. No. 5,304,786), "ArrayTag" (disclosed in U.S. Pat. No. 5,202,552) and "Aztec" (disclosed in U.S. Pat. No. 5,591,956) formats, each of the foregoing being incorporated herein by reference in their entirety. One skilled in the art could readily envision how these and other data entry methodologies could be employed to similar effect.

The dataform pattern 108, along with the human readable version of the transaction dataset 107, is converted into printing instructions by a print driver program executed by the microprocessor 105. The printing instructions are then passed on to the printer 102. The printer 102 prints the human readable information 107, the dataform pattern 108, and optionally the attention symbol 119 and the endsearch symbol 120 onto the receipt 109. The printer also utilizes printing instructions stored on the ROM 106 (or RAM 104) to mark one or more areas 304 on the receipt 109 for entry of handwritten notations by the purchaser.

If the size of the transaction dataset exceeds the memory storage capacity of the dataform 108, the algorithm will include a reference to a second dataform and will partition the additional information into a second dataform. In this example, the transaction data is concatenated, thereby allowing the system to join the data from the two dataform patterns back together into one transaction set.

If the transaction involves a return of merchandise by the purchaser to the vendor, the scanning device 103 is used by the vendor to read the dataform 115 from a prior transaction receipt 116 to obtain the relevant transaction information about the prior transaction. This information includes, but is not limited to, the vendor's database record locator number (s) of the transaction(s) and the product identification number(s) of the transaction item(s) being refunded. This information can be used by the vendor to facilitate the return transaction. In one embodiment, the dataform read by the scanning device comprises all or substantially all of the relevant transaction information, such that no further information access is required. This approach has obvious appeal in terms of reduced data processing and access times. In another embodiment, the dataform comprises a transaction reference identification code which is used by the scanning device (and associated cash register 101) to access a transaction record stored either locally or remotely from the register in a secure database. This latter embodiment is useful in terms of, inter alia, enhanced security, since surreptitious reading and decoding of the dataform (such as if someone other than the purchaser gains access to the receipt) to obtain sensitive information such as the purchaser's credit card number and expiration date is frustrated. Specifically, if the dataform contains only "coded" information (such as the aforementioned transaction identification code), decoding of the dataform will only yield this same information. However, when an authorized scanning device (e.g., one having access to the secure database record to which the transaction identification code) reads the dataform, it is able to access the sensitive information.

As an alternative to the printer 102 and printed dataform previously described, the invention may use a magnetically permeable material for encoding of the dataform. For example, a magnetic "write" head of the type well known in the art (not shown) may be used to encode data onto a magnetically permeable substrate such as that of a magnetic stripe disposed on a card. Rather than (or in addition to) printing a paper receipt, the magnetic head may be used to encode the transaction data onto a card with magnetic stripe which the purchaser carries. In a fashion analogous to credit card swiping of the prior art, the magnetic head encodes data onto the stripe of the purchaser's card for later reading and use. Such an approach has the advantage of storing all such data in one location, in that one card could contain a plurality of dataforms. When the user swipes that same card through a reader (described below), all such dataforms would be read, decoded, and the information contained therein stored at appropriate locations in the database.

Figure 2A:
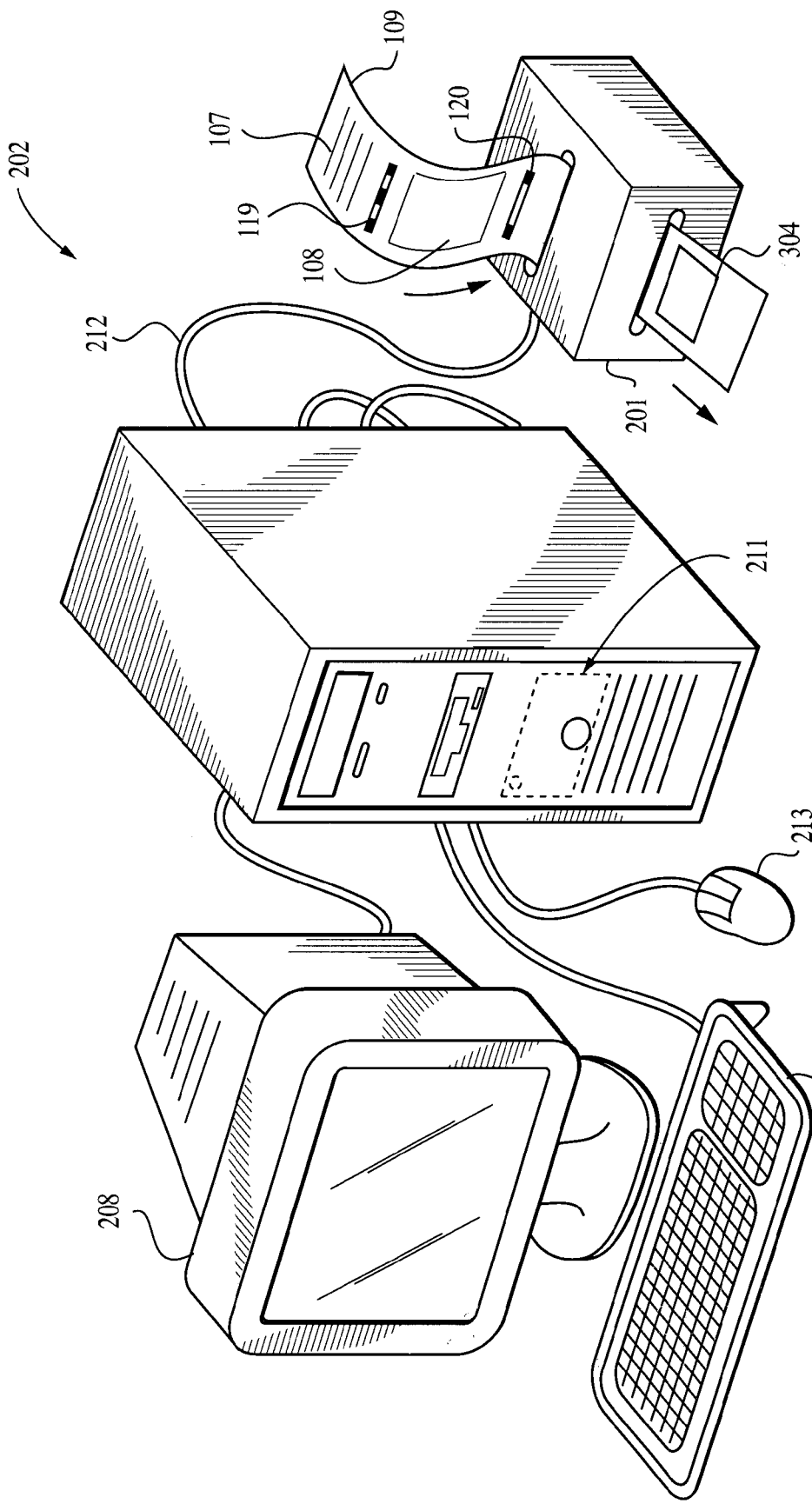
FIG. 2a is perspective view of one exemplary embodiment of the transaction data reading and decoding apparatus of the present invention.
Figure 2B:
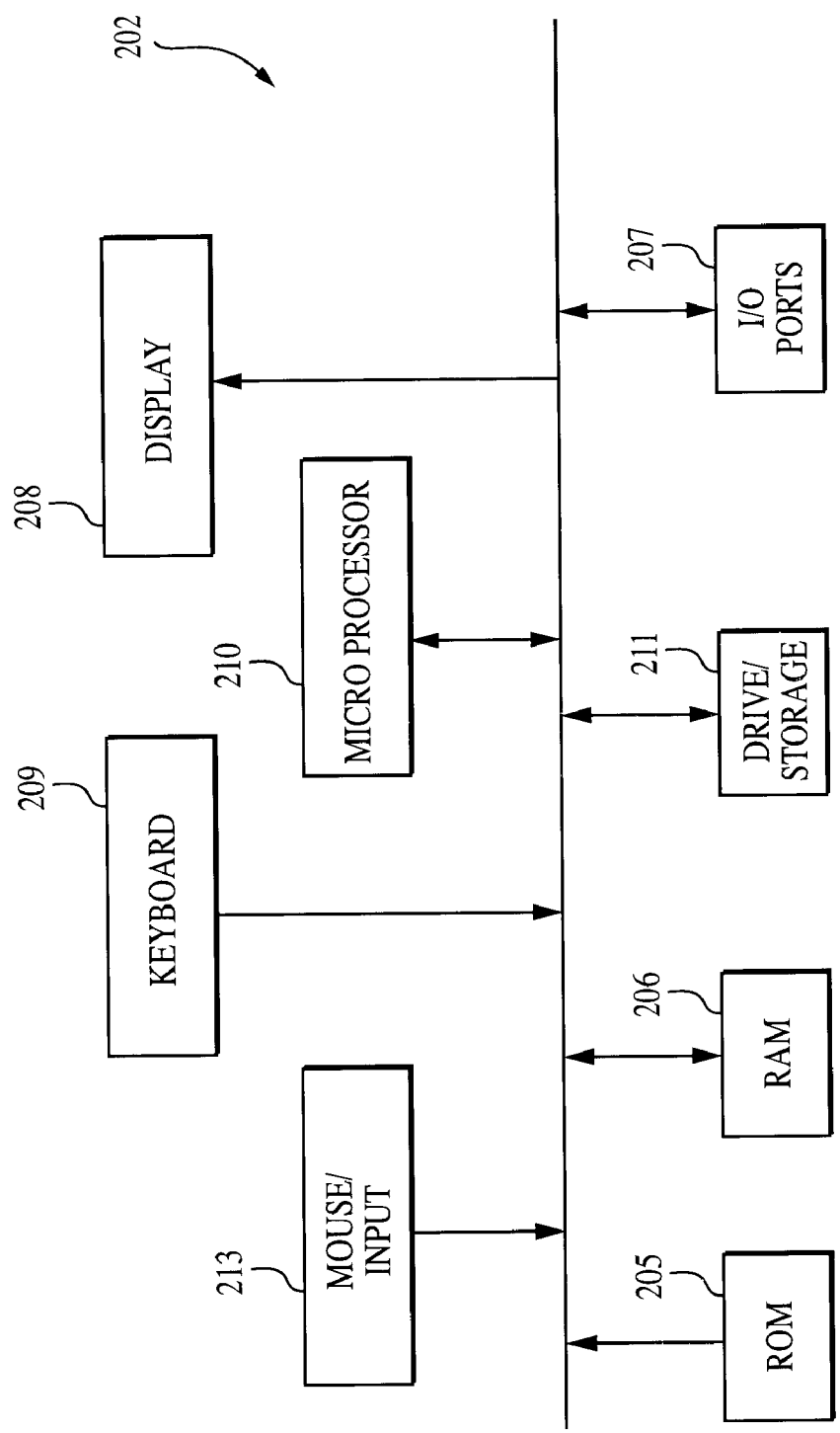

Referring now to FIG. 2, one exemplary embodiment of the system for reading dataforms and other data from the receipt is described. In the embodiment of FIG. 2, a scanning device 103 capable of reading a dataform 108 is connected to a data processing device 202. The data processing device 202 of the present embodiment is a personal computer which incorporates equipment including a ROM 205, a RAM 206, I/O Ports 207, a display 208, a keyboard 209, a microprocessor 210, a hard drive 211 and a mouse 213, as is well known in the computer arts. The computer 202 and the scanning device 103 are connected by a serial connection 212, although other types of connections and interfaces may be substituted as previously described herein. A receipt 109 optionally contains a variety of information including human readable transaction data 107, a dataform 108, an attention symbol 119 and an endsearch symbol 120. The receipt 109 may also contain handwritten notations 304.

Figure 6:
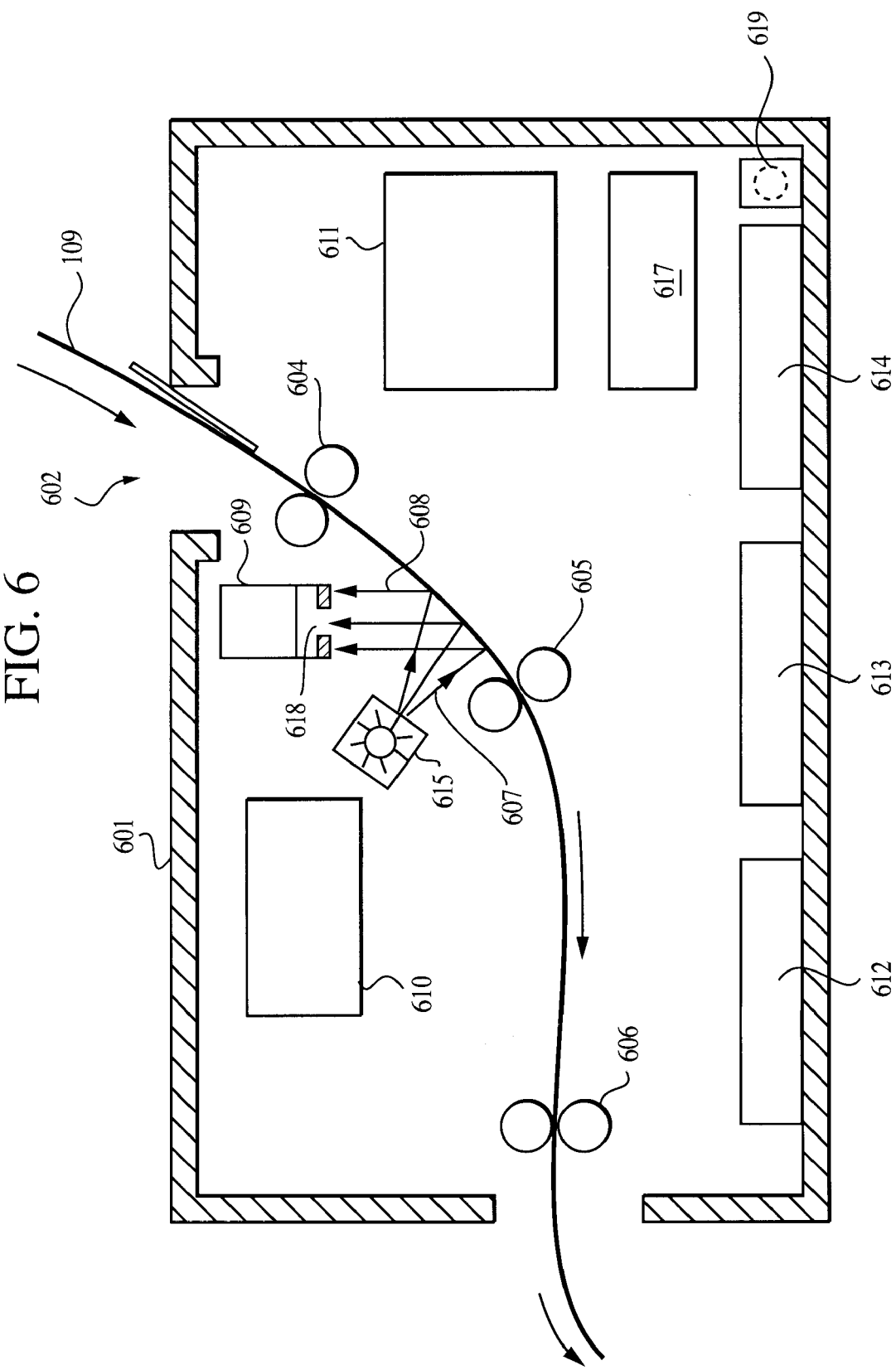
FIG. 6 is a cross-sectional view of the scanning device (103) of FIG. 1a taken along line 6—6, illustrating the various internal components thereof.

One exemplary configuration of the scanning device 103 used to read the dataform 108 is described in detail herein with reference to FIG. 6. While the embodiment of FIG. 6 is used as the basis for the following discussion of the scanning methodology of the invention, it will be appreciated that other scanning devices, such as those described in, among other references, U.S. Pat. No. 4,251,798 (Swartz, et al.); U.S. Pat. No. 4,360,798 (Swartz, et al.); U.S. Pat. No. 4,369,361 (Swartz, et al.); U.S. Pat. No. 4,387,297 (Swartz, et al.); U.S. Pat. No. 4,409,470 (Shepard, et al.); U.S. Pat. No. 4,460,120 (Shepard, et al.); U.S. Pat. No. 5,319,181 (Shellhammer, et al.); U.S. Pat. No. 5,331,176 (Sant' Anselmo, et al.) and U.S. Pat. No. 5,773,806 (Longacre, et al.), may be used with equal success. Each of the foregoing U.S. Patents is incorporated herein by reference in its entirety.

To scan a receipt, the receipt 109 is inserted face up into the scanning device 103. Internal rollers advance the receipt 109 through the scanning device 103. This provides the scanning device with positive control over the movement of the receipt 109 while it is being scanned, allowing the scanning device to control the orientation and location of the dataform 108.

A light source within the scanning device 103 projects a beam of light onto the receipt 109. The light is reflected by the light and dark colored elements of the dataform 108 to a photodiode detector array in the scanning device. An aperture (not shown) between the photodiode detector array and the reflected light limits the light received by the photodiode detector array to reflected light from a specific area of the scanned receipt. This is the entire field of imagery analyzed by the photodiode detector array at any one moment in time (the "Scanned Field"). The aperture is shaped so that it provides a linear Scanned Field of a width at least equal to the width of the dataform 108. The receipt 109 is advanced through the scanning device 103, causing the dataform 108 to move through the Scanned Field. As the dataform 108 moves through the Scanned Field, the photodiode detector array sequentially reads light reflected from the portion of the dataform 108 passing through the Scanned Field. The reflected light varies in proportion to the reflectivity of the specific portion of the dataform 108 illuminated in the Scanned Field. The dataform 108 pattern's dark colored elements reflect less light than the light colored elements. The instantaneous electrical output of the photodiode detector array at any one moment in time represents the localized reflectivity of the portion of the dataform 108 in the Scanned Field. The signal is passed to a signal amplifier. The signal amplifier boosts the signal and sends it to an analog/digital converter which converts the current into a digitized signal. As the dataform 108 moves through the Scanned Field, the digitized signals are stored as successive lines of imagery data in a RAM (not shown). The stored data is then analyzed using a digital signal processor to derive the dataform 108 pattern. The derived dataform 108 symbology is then identified and the appropriate decoding methodology is applied to decode the dataform 108 and derive the transaction data including the transaction data characterization information. The characterization data is used to assign the discrete pieces of decoded transaction data to memory storage locations in the RAM 206 corresponding to the predefined categories previously described with reference to FIG. 1. The received transaction dataset is then passed through the serial connection 212 to the computer 202 and mapped to a database on the computer 202 where the transaction data is available for analysis by other software applications.

Note that attention symbol 119 printed on the receipt 109 immediately above the dataform 108 cues the scanning device 103 to the presence and relative location of the dataform 108. After the attention symbol 119 is scanned and recognized, the scanning device software begins analyzing the scanned input for the dataform 108 pattern (the "dataform Input Phase"). As the process of searching for, storing and analyzing the dataform 108 imagery is memory and microprocessor intensive, the attention symbol allows the scanning device to minimize the amount of time devoted to searching for the dataform 108 in the scanned imagery data. The endsearch symbol 120 cues the scanning device 103 to stop the dataform Input Phase, similarly conserving system resources.

Other methods of image scanning, including vision-based scanning employing charge-coupled devices ("CCDs"), are well known to those skilled in the art. Accordingly, one skilled in the art can readily see that the scanning device 103 described is only one example of several types of scanning devices which could be so employed.

As previously described, the transaction receipt 109 also optionally contains a human readable version of the transaction information 107. In another aspect, the scanning device 103 can be used to scan the purchaser's handwritten notations in the designated area 304 of the receipt 109, convert the scanned imagery into digital information, store the data in memory and analyze it using optical character recognition (OCR) algorithms to convert the notations to text. The text is then stored in a predefined memory storage location as comments associated with the transaction data read from the annotated receipt. Alternatively, a second algorithm is used to compare words within the identified text against a preset list of words, thereby allowing certain preset or user defined words to signal the system to characterize the associated transaction data as belonging to either a user defined or predefined category or transactions. For example, if a purchaser annotates a receipt to include the words "home office" in the designated field of the receipt, the OCR algorithms recognize and convert the handwritten notations to textual characters (e.g., ASCII). A second algorithm is used to identify coding within the converted text which corresponds to the classification "home office", and store the associated decoded transaction data at a prescribed memory location associated with home office entries.

Figure 3:
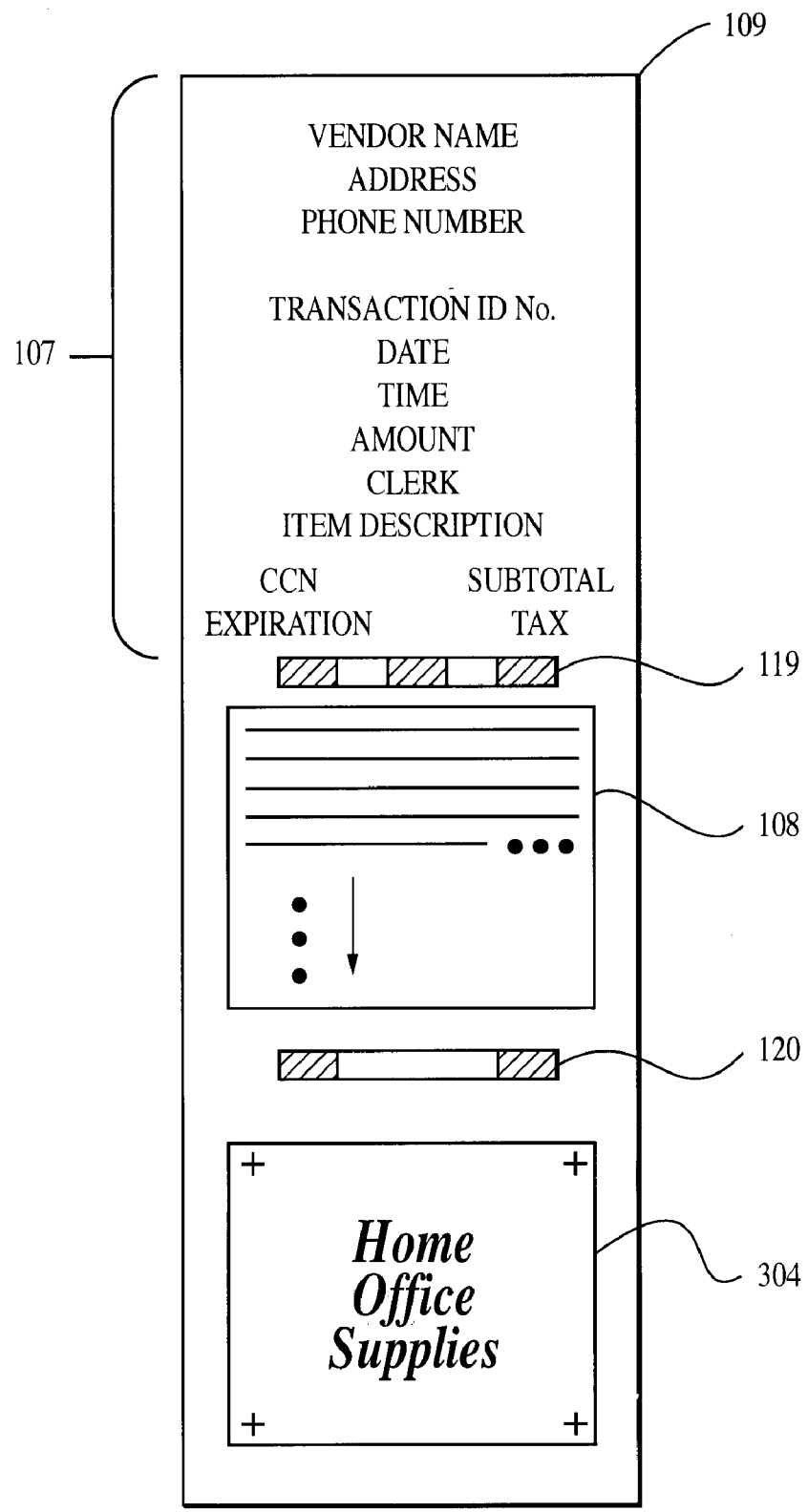
FIG. 3 is a plan view showing one exemplary configuration of a receipt incorporating human and scanning device readable versions of the transaction data.

FIG. 3 illustrates an exemplary layout for a receipt 109. The receipt 109 includes a human readable version 302 of the transaction dataset and a machine readable dataform 108 containing the transaction dataset and provides an area 304 in which purchasers may record additional information regarding the transaction. The human readable version 302 of the transaction data may optionally include the purchaser's credit card number 305. If such information is included in the receipt 109, optionally, some numbers of the purchaser's credit card number 305 may optionally be replaced with null numbers to enhance security by preventing the numbers from being read from the receipt without the aid of dataform reading equipment. An attention symbol 119 appears above the dataform 108. An endsearch symbol 120 appears below the dataform 108.

The attention symbol 119 is located above the dataform 108 on the receipt 109. It is positioned above the dataform and configured so that it cues the scanning device to employ algorithms to search the scanned imagery data that follows for the dataform. The endsearch symbol 120 is located below the dataform 108 on the receipt 109. It is positioned below the dataform and configured so that it cues the scanning device to stop searching the scanned imagery data for the dataform. Note that because the attention 119 and endsearch 120 symbols are of different patterns, the order that they are imaged by the scanning device indicates the orientation of the Receipt 109 and the dataform 108.

In one embodiment, the attention symbol 119 is formed by three solid, evenly spaced dark colored vertical bars of predefined dimensions. The vertically and horizontally consistent elements of the attention symbol 119 signal software executed on the scanning device microprocessor that the dataform 108 pattern follows immediately after the attention symbol 119. Upon receiving this signal, the scanning device employs an algorithm to analyze the incoming scanning signal for known dataform patterns. One skilled in the art can readily see that other patterns employing structures that are similarly consistent could be employed to similar effect.

Also note that while the purchaser's credit card number 305 is fully encoded within the dataform 108, in the human readable version 302 of the transaction data printed on the receipt 109, only the first four numbers of the purchaser's credit card number are printed. All remaining digits of the credit card number are replaced with an "X" or similar null characters, thereby preventing a casual viewer from reading the purchaser's credit card number from the receipt 109.

Figure 4:
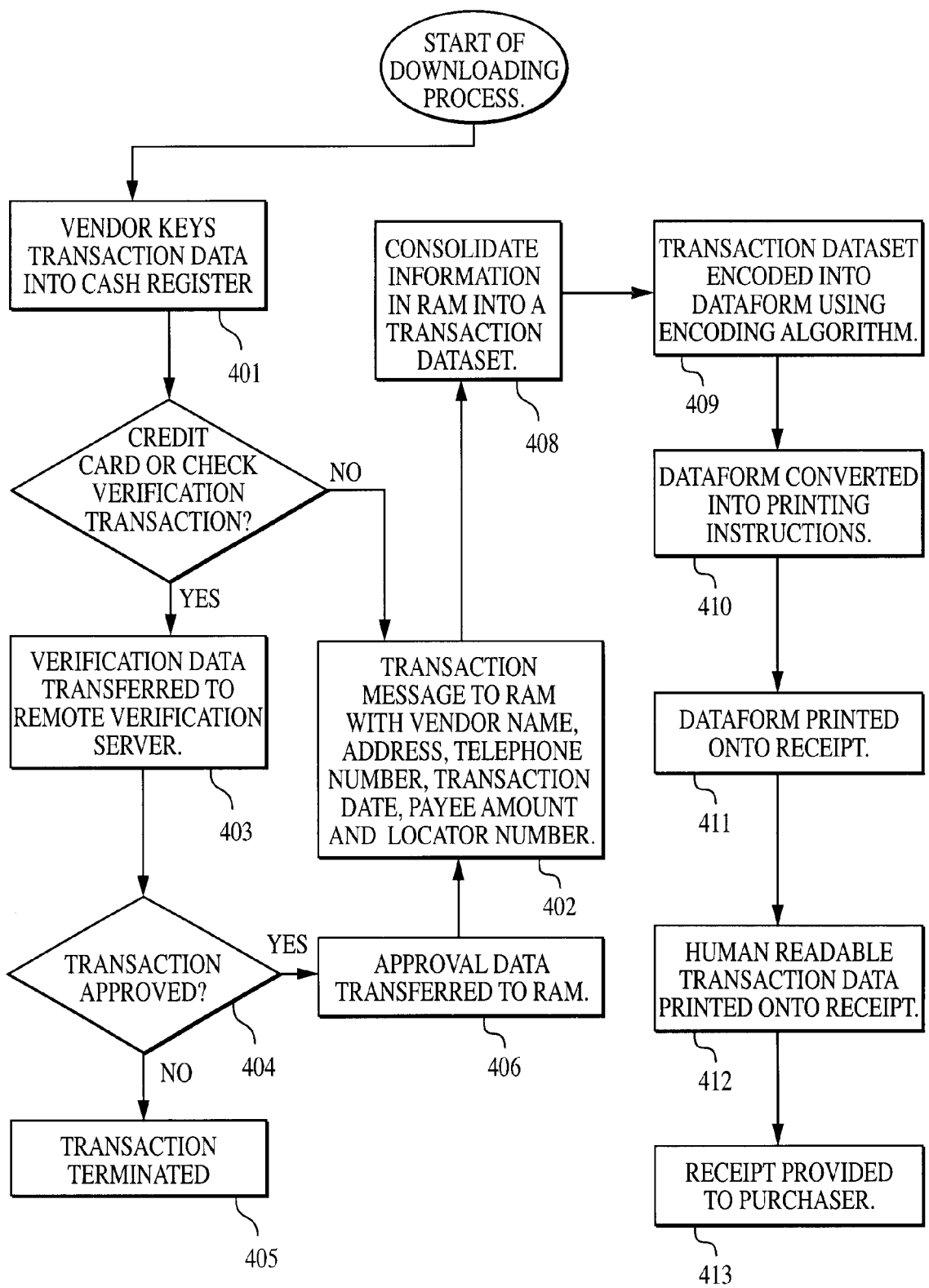
FIG. 4 is a logical flow chart illustrating one embodiment of the data encoding process of the present invention.

FIG. 4 is a logical flowchart showing one embodiment of the method of encoding transaction data using the system of FIG. 1. First, the vendor enters the transaction data into a cash register (step 401). If the transaction does not involve a credit card or check verification, the transaction information is passed to the RAM (step 402). If the transaction involves a credit card or check verification, the information is sent to a remote verification server (step 403) for approval. If the transaction is not approved (step 404), it is terminated (step 405). If the transaction is approved, the approval data is transferred to the RAM (step 406) along with the transaction information (step 402). Algorithms executed on the cash register microprocessor characterize the transaction data using preset categories and based on those characterizations, store the transaction data in designated locations in memory (step 407). The characterized transaction data is then consolidated into a transaction dataset (step 408). The transaction dataset is then encoded into a dataform (step 409). The dataform is then converted into printing instructions (step 410) and printed onto the receipt (step 411). A human readable version of the transaction data is also printed onto the receipt (step 412). The receipt is then provided to the purchaser (step 413).

Figure 5:
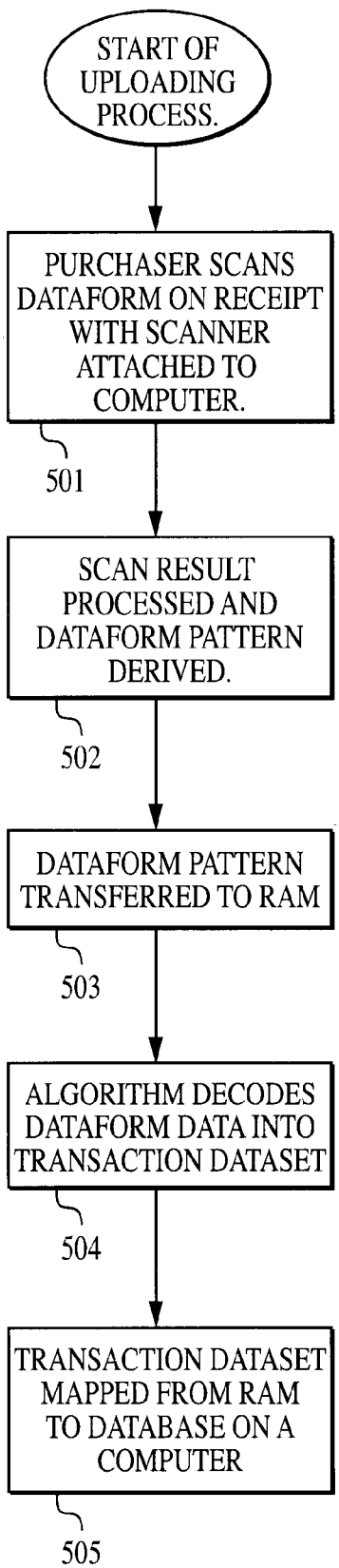
FIG. 5 is a logical flow chart illustrating one embodiment of the data reading/decoding process of the present invention.

FIG. 5 is a logical flowchart showing one embodiment of the method of reading and decoding encoded transaction data, using the system of FIG. 2. The purchaser scans the dataform using a scanning device attached to a computer (step 501). The scanned image data is digitized and processed to derive the dataform pattern (step 502). The dataform is transferred to the RAM (step 503). An algorithm executed on the microprocessor decodes the dataform to derive the transaction dataset (step 504). Using the characterization information encoded in the transaction dataset, the categorized transaction data is mapped from the RAM into memory locations in a computer corresponding to the categories of the transaction data (step 505).

FIG. 6 illustrates one exemplary configuration 601 for a dedicated receipt scanning device 103. The scanning device 601 contains a microprocessor 612, a RAM 613, a digital signal processor 617 and a ROM 614 and incorporates a receipt feed slot 602 into which a receipt 109 is inserted face up. Movement of the receipt 109 within the scanning device 601 is controlled by means of feed/drive rollers 604, 605, 606. The scanning device 601 incorporates a light source 615 projecting an illuminating beam 607 onto the receipt 109. The light source may be a coherent source (e.g. LASER), or alternatively a broad spectrum source such as an incandescent lamp. The reflected light 608 from the illuminating beam 607 is passed through an aperture 618 and detected by a photodiode detector array 609 connected to a signal amplifier 610 which is in turn connected to an analog to digital converter (ADC) 611. The scanning device 601 is connected to a computer (not shown) through a serial connection 619, although other types of connection may be used as previously described.

The user inserts the receipt 109, oriented face up, in the receipt feed slot 602 until it is engaged by the first feed/drive roller 604. The side walls of the receipt feed slot 602 guide the receipt towards the first feed/drive roller 604. The feed/drive roller 604 advances the receipt through the scanning device 601 until the dataform 108 on the receipt 109 is illuminated by the illuminating beam 607 projected by the light source 615. The illuminating beam 607 is reflected by the light and dark areas of the dataform to the photodiode detector array 609. The light and dark portions of the dataform reflect different amounts of light resulting in variations in the reflected light 608. The reflected light 608 is detected by the photodiode detector array 609. The aperture 618 between the reflected light 608 and the photodiode detector array 609 limits the reflected light 608 received by the photodiode detector array 609 to light reflected from a specific area of the scanned receipt and creates a scanned field which is the entire field of imagery analyzed by the photodiode detector array 609 at any one moment in time. The aperture 618 is shaped so that it provides a linear scanned field of a width at least equal to the width of the dataform. In response to the reflected light 608, the photodiode detector array 609 generates a small electrical current that varies in proportion to the amount of reflected light 608 detected. This current is passed to the signal amplifier 610 which amplifies the electrical signals generated by the photodiode detector array 609 and passes the amplified signal to the A/D Converter 611. The A/D Converter 611 converts the electrical signals into digital samples which are stored in successive memory locations in the RAM 614. The feed/drive rollers 604, 605, 606 are controlled by the microprocessor 612 and advance the receipt 109 past the illuminating beam 607 allowing the entire dataform 108 to be scanned. The microprocessor 612 executes algorithms stored in the ROM 613 to analyze the signal received by the A/D Converter 611 and to identify and differentiate between scanned dataform imagery and other non-dataform imagery. After the entire dataform is scanned by the photodiode detector array 609, the digital signal processor 617 analyzes the stored digital samples in the RAM 614, determines the dataform pattern from the stored digital samples, identifies the symbology of the dataform and applies the appropriate decoding algorithm to decode the dataform, revealing the transaction dataset and the associated transaction data characterization information. Using the characterization information, software stored on the ROM 613 and executed by the microprocessor 612 stores the transaction data memory address locations in the RAM 614 which are pre-designated to correspond to pre-determined characterization categories. The microprocessor 612 then employs an algorithm stored on the ROM 613 to map the transaction data from the RAM 614 through the serial connection 619 to a database on the computer where the transaction data is available for analysis by other software applications.

It will be recognized that while the embodiment of FIG. 6 utilizes varying degrees of reflectivity of the dataform in order to encode/decode data, other approaches may conceivably be used with the present invention. For example, the dataform may be rendered in terms of materials of varying light absorption at prescribed wavelengths. Alternatively, fluorescent or phosphorescent materials could be used to form or coat portions of the dataform, such materials varying in the strength and/or wavelength of light emitted in response to a stimulating light source in contrast to other portions of the dataform not so coated. Magnetically permeable coatings may be used, as previously described, such that no light source is used, but rather a magnetic read/write head of the type well known in the art. Many other such alternatives are possible, all considered to be within the scope of the invention claimed herein.

Figure 7:
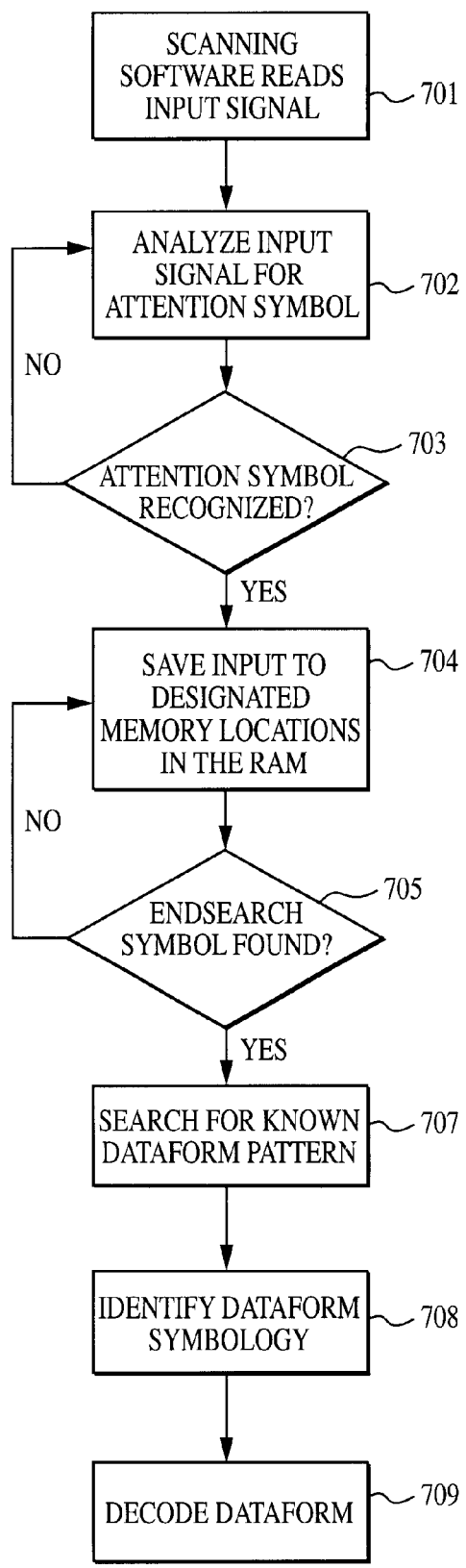
FIG. 7 is a logical flow chart illustrating one embodiment of the method of recognizing the "attention" and "endsearch" symbols printed on the receipt of FIG. 3.

FIG. 7 is a flow chart illustrating the scanning device's operation in conjunction with the attention and endsearch symbols. Software executed on a microprocessor in the scanning device reads the input scanning signal (701). The software analyzes the input signal for the signature of the attention symbol (702) until it recognizes the attention symbol (703). On finding the attention symbol, the scanned imagery that follows is saved to designated memory locations in the RAM (704) and the software begins searching for the endsearch symbol (705). On finding the endsearch symbol (706), the software examines the imagery saved in the designated memory locations in RAM and assembles the dataform contained in the signals stored therein (707). Once the entire symbol is assembled, the software analyzes the image to identify the dataform symbology and the appropriate decoding algorithm (708). The software then uses the algorithm to decode the dataform (709).

As previously described, the mapping of the transaction data corresponds to the characterizations made by the vendor and/or the purchaser so that, for example, the numerical data representing the total price of the transaction is recognized by the purchaser's database as the value reflecting the total price of the transaction. So stored, the transaction data can be accessed by various software applications. Among other functionality, such software applications further allow the purchaser to "hand key" the handwritten notations he or she previously made on the receipts into the computer. Three exemplars of software that would access the transaction data stored on the purchaser's computer are spreadsheet software, formatting/translation software for exporting the transaction data for processing by other software, and report generation software for creating human readable expense reports for corporate expense reporting uses. However, one skilled in the art can readily see that any software application designed or adapted to access data so stored could be employed to access and utilize the transaction data.

In another embodiment of the invention, the scanning device scans and stores the entire receipt 109 as a single image (the "Receipt Image"). Through recognition of unique identifier symbols (e.g., the "attention" and "endsearch" symbols described above) the dataform pattern 108 is identified as one component of the scanned image and is decoded and processed as described above. The Receipt Image is retained as a discrete file within the system, and is marked with an indexing identifier relating it to the characterized transaction data that was decoded from the dataform on the Receipt Image and stored. So stored, the Receipt Image can be subsequently accessed by various software applications or transmitted as required.

Figure 8:
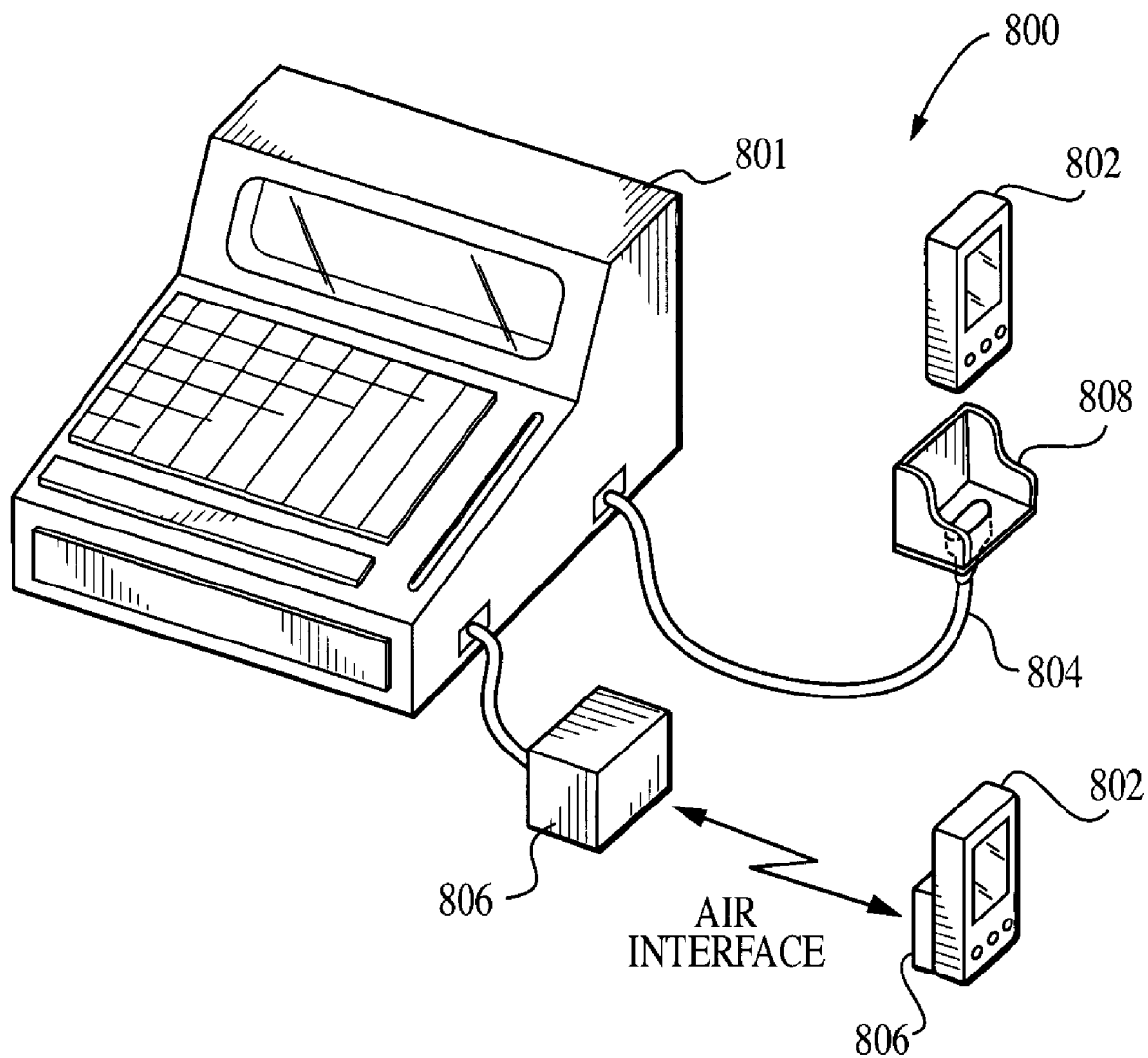
FIG. 8 is a perspective view illustrating a second embodiment of the transaction encoding and decoding system of the present invention, including a wireless interface to a personal digital assistant (PDA) or other data processing device.

In yet another embodiment of the invention 800 (shown in FIG. 8), the cash register 801 employs a wired (i.e., direct cable connection) 804 or wireless transmission interface 806 to transmit vendor entered transaction data from the cash register 801 to a customer's data processing device (e.g., PDA) 802 for subsequent use or transfer. In the wired connection option, a cradle 808 or other device for receiving the PDA is used. Cable based wired transfer methods, such as that specified for RS-232 connections, are well understood in the industry, and accordingly are not described further herein. A number of different wireless transmission methodologies (air interfaces) may be employed to transfer transaction data from the cash register to a PDA or other data processing device including, inter alia, point to point transmission via the Infrared Data Association's ("IrDA") infrared based wireless transmission standard; wireless radio frequency ("RF") based local area network ("LAN") connections based on the IEEE 802.11 LAN access standard (including both frequency-hopping and direct sequence spread spectrum variants); the "Bluetooth" 2.45 GHz frequency band based wireless communication specification, both passive and active radio frequency identification technology (collectively "RFID"), and the Home RF Shared Wireless Access Protocol. The construction and operation of each of these air interfaces is well known in the communications arts, and accordingly is not described further herein.

After creating a transaction dataset comprising the transaction-related data previously described with respect to FIG. 1, the cash register 801 converts the transaction dataset into an appropriate transfer format via software resident on the cash register, and transmits the dataset to the PDA, which is equipped to receive the transmission in the specified protocol. The dataset is then stored in RAM of the PDA, or another storage device associated therewith. At some later time, the purchaser uses custom developed synchronization software or software based on commercially available database synchronization utilities to map the characterized transaction dataset with the PDA's RAM or storage device to a designated database or databases on the purchaser's personal computer (PC) 805 or another data processing device. Examples of commercially available synchronization software of the typed referenced herein include, but are not limited to, IntelliSync™ manufactured by Puma Technology, and PocketMirror™ manufactured by Chapura. So stored, the transaction data can be accessed by various software applications on the purchaser's computer and/or transmitted as required. One skilled in the art can readily see that any device communication protocol designed or adapted to access data so stored could be employed to access and transmit the transaction data.

Figure 9:
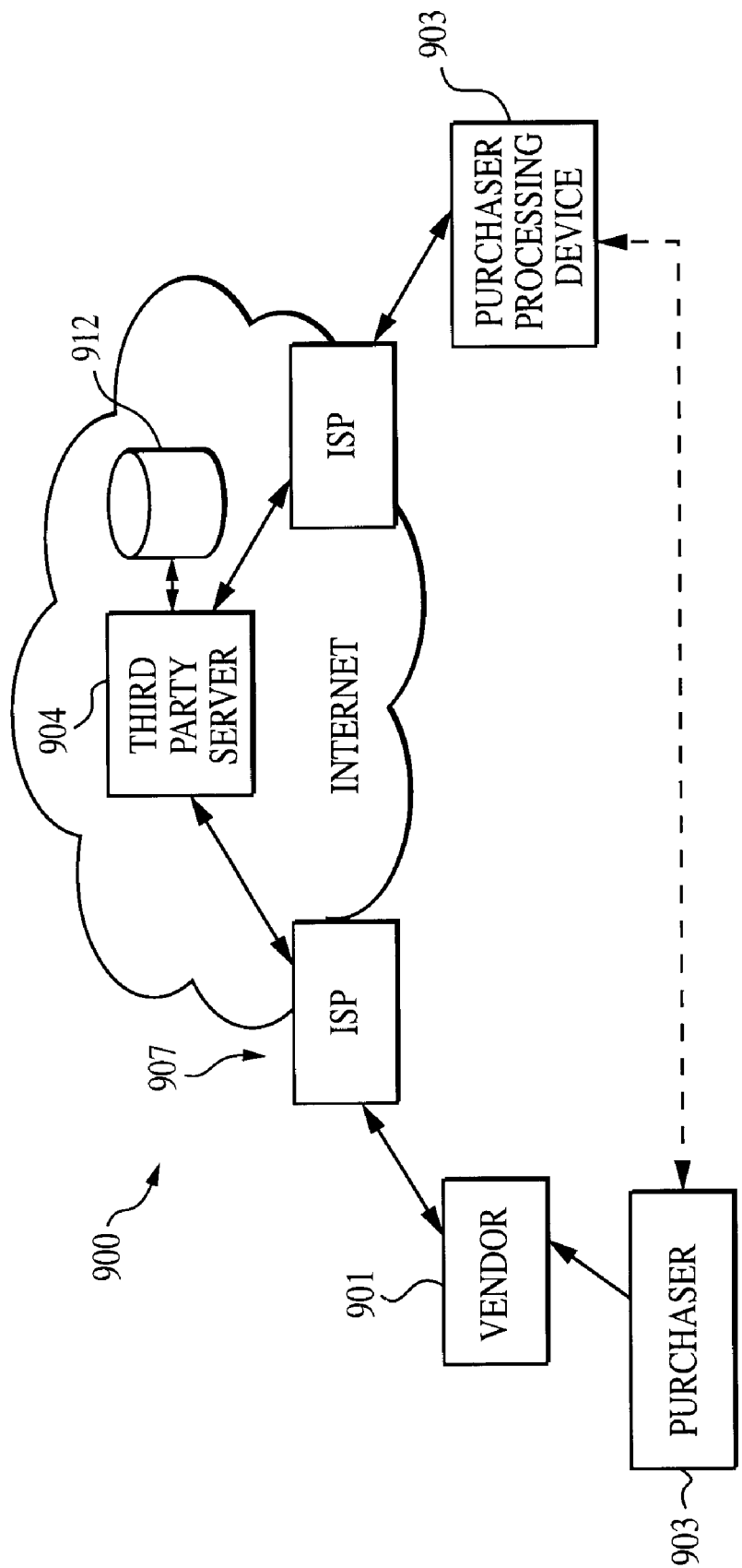
FIG. 9 is a logical block diagram illustrating a third embodiment of the transaction encoding and decoding system of the present invention, including a networked interface to a remote third-party server accessible to both the vendor and purchaser involved in a transaction.

Referring now to FIG. 9, yet another embodiment of the transaction encoding and decoding system of the present invention is disclosed. In the embodiment of FIG. 9, the transaction encoding and decoding system 900 includes a networked interface 902 to a remote third-party server 904 accessible to both the vendor 901 and purchaser 903 involved in a transaction. In the illustrated embodiment, the vendor transmits the transaction data to the server 904 via a standard network connection 907 such as that provided by an Internet service provider (ISP) using, for example, the well known TCP/IP or FTP protocols. Such connections may include, for example, the well known dial-up connection, digital subscriber line (DSL), or DOCSIS (cable modem), although others may be used. Alternatively, the server and vendor may be part of a local area network (LAN), wide-area network (WAN), or intranet. Similarly, the purchaser 903 may gain access to the server 904 via similar network connections. The server 904 of the present embodiment further includes a secure database 912 for storing transaction data received from a plurality of vendors and relating to a plurality of different transactions. Such transaction data is advantageously stored based on a transaction identification code or other data, and may be password protected and/or encrypted using public-key or other types of encryption to further thwart surreptitious access. Similarly, one or more of the network connections 907 may comprise a virtual private network (VPN) which creates an secure "tunnel" across public networks such as the Internet.

Figure 10:
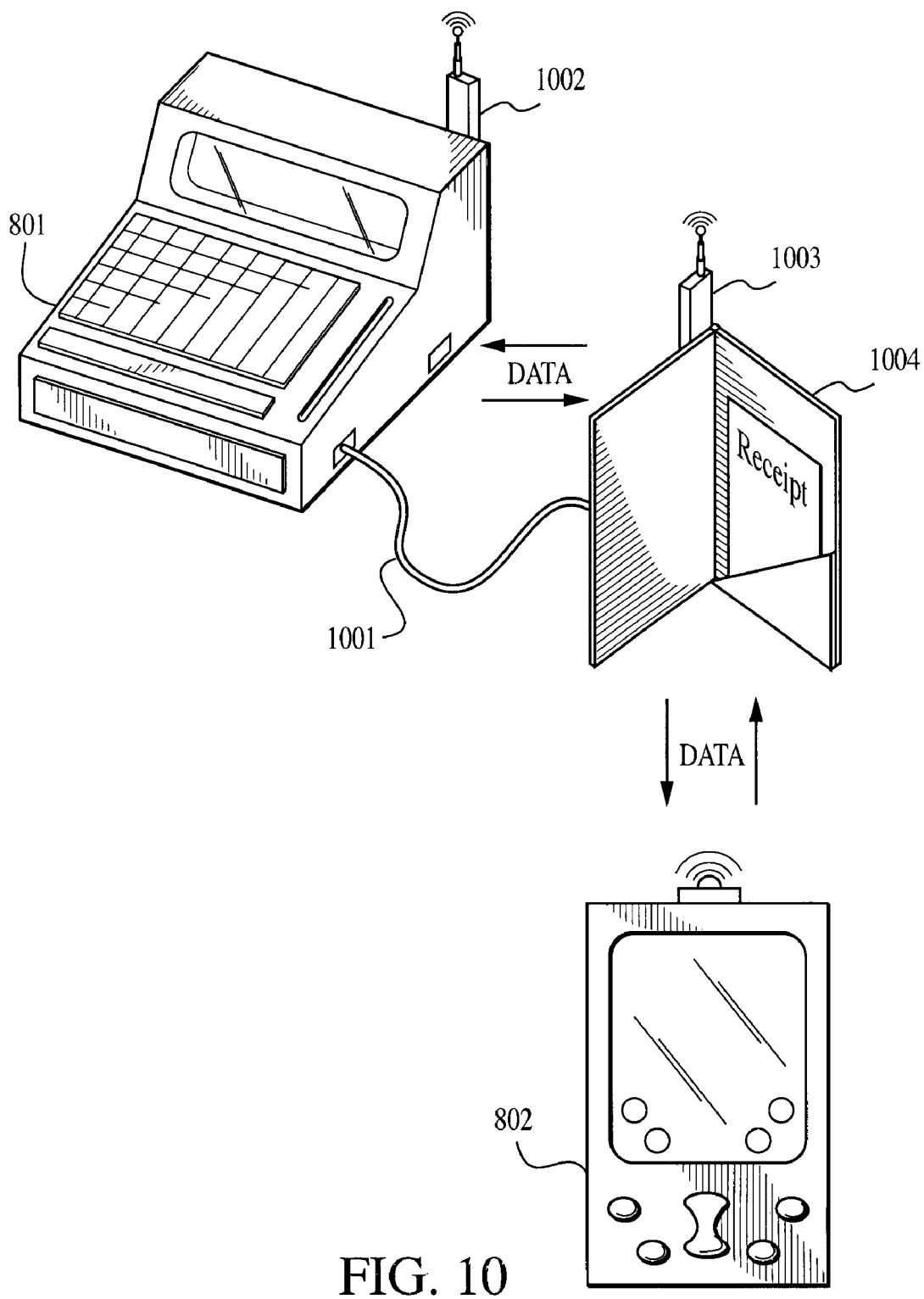
FIG. 10 is a perspective view illustrating a fourth embodiment of the transaction encoding and decoding system of the invention, including a radio frequency identification (RFID) tag.

Referring now to FIG. 10, in yet another embodiment of the invention, the cash register 1001 employs a wired (i.e., direct cable connection) or wireless transmission method to transmit vendor entered transaction data from the cash register to a small dedicated device. Cable based wired transfer methods, such as that specified for RS-232 connections, are well understood in the industry, and accordingly are not described further herein. In one embodiment the RFID chip A number of different wireless transmission methodologies (air interfaces) may be employed to transfer transaction data from the cash register to a PDA or other data processing device including, inter alia, point to point transmission via the Infrared Data Association's ("IrDA") infrared based wireless transmission standard; wireless radio frequency ("RF") based local area network ("LAN") connections based on the IEEE 802.11 LAN access standard (including both frequency-hopping and direct sequence spread spectrum variants); the "Bluetooth" 2.45 GHz frequency band based wireless communication specification, and the Home RF Shared Wireless Access Protocol. The construction and operation of each of these air interfaces is well known in the communications arts, and accordingly is not described further herein.

Referring now to FIG. 10, yet another embodiment of the invention is described. An intermediary transceiver device 1003 is used to convey the transaction data from the cash register 801 to a PDA or other data processing device 801 at a location that is remote from the cash register 801. For example, in the context of a restaurant, the transceiver device 1003 would be used to transfer transaction data from the cash register 801 to a customer's PDA 801 without requiring the customer to leave his or her table to go to the cash register 801. The cash register 801 employs a wired (i.e., direct cable connection) 1001 or wireless 1002 transmission method to transmit vendor entered transaction data from the cash register 801 to a small dedicated transceiver and temporary storage device 1003 in a manner substantially similar to that previously described with respect to FIG. 8. As previously stated, a number of different wired and wireless transmission methodologies (air interfaces) may be employed to transfer transaction data from the cash register to a PDA or other data processing device 802; the construction and operation of each of these air interfaces is well known in the communications arts, and accordingly is not described further herein. In the preferred embodiment, the transceiver (or in the case of RFID an RF Tag) and (depending on the wireless or wired transmission method used) associated ROM, RAM, battery, memory and antenna components (not shown), are embedded in a small folder 1004 similar in appearance and size to the type commonly used by restaurants to hold bills presented to restaurant patrons for payment. At some time after the transaction data is transferred into the transceiver device 1003, the transaction data is again transferred from the transceiver device 1003 to a PDA or other data processing device 802 in a manner substantially similar to that described in FIG. 8 for transfer of transaction data between the cash register 801 and a PDA or other data processing device 802.

It will be recognized that while certain aspects of the invention are described in terms of a specific sequence of steps of a method, these descriptions are only illustrative of the broader methods of the invention, and may be modified as required by the particular application. Certain steps may be rendered unnecessary or optional under certain circumstances. Additionally, certain steps or functionality may be added to the disclosed embodiments, or the order of performance of two or more steps permuted. All such variations are considered to be encompassed within the invention disclosed and claimed herein.

While the above detailed description has shown, described, and pointed out novel features of the invention as applied to various embodiments, it will be understood that various omissions, substitutions, and changes in the form and details of the device or process illustrated may be made by those skilled in the art without departing from the invention. The foregoing description is of the best mode presently contemplated of carrying out the invention. This description is in no way meant to be limiting, but rather should be taken as illustrative of the general principles of the invention. The scope of the invention should be determined with reference to the claims.

What is claimed is:

1. A system for encoding transaction data, comprising:
   a data processing device capable of receiving transaction data from a data source;
   a data storage device in data communication with said processing device for storing data;
   a computer program adapted to run on said data processing device, said computer program being adapted to encode said transaction data into a predetermined pattern for subsequent use by an end user; and
   a device capable of generating said predetermined pattern on a substrate.

2. The system of claim 1, wherein said predetermined pattern comprises a dataform pattern, said dataform pattern being recognizable by a scanning device.

3. The system of claim 2, wherein said data source comprises a cash register.

4. The system of claim 2, wherein the act of generating said predetermined pattern comprises printing said dataform onto a paper receipt.

5. A system for encoding and decoding transaction data, comprising:
   a data processing device in data communication with a transaction data source, said data processing device being capable of receiving transaction data from said source;
   a computer program adapted to run on said data processing device, and further adapted to categorize said transaction data received from said source into at least one category, and encode said data into a predetermined pattern;
   a device capable of generating said pattern onto a substrate;

a scanning device capable of reading at least a portion of said pattern from said substrate; and a decoding device operatively coupled to the scanning device adapted to derive the encoded and categorized transaction data from said pattern.

6. The system of claim 5, wherein said device capable of generating comprises a printer.

7. The system of claim 6, wherein said scanning device comprises an electro-optic scanning device including a light source and detector array.

8. The system of claim 6, wherein said decoding device comprises a second computer program, said second computer program being adapted to identify data within said predetermined pattern, and separate individual ones of said data based on said at least one category.

9. The system of claim 8, further comprising a database, wherein said individual ones of said data are stored within said database based at least in part on said at least one category.

10. The system of claim 9, wherein said decoding device is further adapted to recognize and decode annotations made on said substrate by a user, said annotations being used by said decoding device to further categorize said transaction data.

11. A method of encoding transaction data, comprising:
entering said transaction data into one or more data fields adapted to receive such data;
categorizing at least a portion of said transaction data according to at least one predetermined classification;
encoding said transaction data into one or more predetermined patterns, said pattern adapted to be recognized by a scanning device; and
affixing said pattern to a substrate.

12. The method of claim 11, wherein the act of entering comprises:
receiving transaction data from a source; and
entering portions of said data into respective ones of said data fields based at least in part on information contained within said transaction data.

13. The method of claim 11, wherein the act of categorizing comprises:
examining two or more of said data fields; and
assigning said transaction data to one or more categories based on which data fields said data is stored within.

14. A method of communicating transaction data, comprising:
receiving said transaction data from a data source;
categorizing said transaction data based on one or more predetermined classifications;
encoding the transaction data into a dataform pattern;
printing the dataform pattern onto a receipt;
reading the dataform pattern from the receipt using a scanning device;
decoding the dataform pattern to derive the categorized transaction data; and
storing the decoded transaction data in a computer database.

15. The method of claim 14, wherein the act of storing comprises storing at least one portion of said decoded transaction data in a different location than other portions of said data based at least in part on said one or more predetermined classifications.

16. The method of claim 14, further comprising:
reading annotations made by a user from said receipt using said scanning device; and decoding said annotations to produce decoded annotations;
wherein the locations within said database wherein individual ones of said transaction data are stored is based at least in part on said decoded annotations.

17. The method of claim 16, wherein said annotations are decoded at least in part using an optical character recognition (OCR) computer program.

18. A scanning device useful for obtaining transaction data from a tangible medium having a dataform disposed thereon, said transaction data being adapted for use by an end user, comprising:
a light source capable of emitting electromagnetic radiation of at least one wavelength;
a positioning device for positioning said tangible medium with respect to said light source as a function of time;
a light detector for detecting light generated by said source and reflected from said tangible medium, said dataform causing modulation of said reflection as said medium is positioned as a function of time by said positioning device, said light detector generating a signal related to modulation of said reflection; and
a decoder operatively connected to said light detector, said decoder being adapted to decode said signal and extract transaction data therefrom.

19. The scanning device of claim 18, further comprising a data interface to a data processing device, said interface adapted to transfer said extracted transaction data from said scanning device to said data processing device for subsequent use by said customer.

20. The scanning device of claim 19, wherein said interface comprises a wireless interface, and said data processing device comprises a mobile device.

21. A system for encoding transaction data, comprising:
a data processing device capable of receiving transaction data from a data source;
a data storage device in data communication with said processing device for storing data;
a computer program adapted to run on said data processing device, said computer program being adapted to encode said transaction data into a data format; and
a data transfer device adapted to transfer said transaction data in said data format to a mobile device adapted to receive and store said transaction data.

22. The system of claim 21, wherein said data transfer device comprises a wireless transceiver.

23. The system of claim 22, wherein said wireless transceiver comprises a transceiver compliant with the Bluetooth Standard.

24. The system of claim 23, wherein said wireless transceiver comprises a direct sequence spread spectrum transceiver.

25. The system of claim 23, wherein said transaction data includes data identifying at least one category associated with a given transaction.

26. A system for encoding transaction data, comprising:
a data processing device capable of receiving transaction data from a data source;
a data storage device in data communication with said processing device for storing data;
a computer program adapted to run on said data processing device, said computer program being adapted to encode said transaction data into a data format; and
a data transfer device adapted to transfer said transaction data in said data format to a remotely located data processing device adapted to receive and store said transaction data.

27. Apparatus adapted for transmitting transaction data from a first device to a second device, said first device being configured to generate said transaction data, the apparatus comprising:

a data interface coupled to said first device, said data interface being adapted to receive said transaction data;

a data encoder adapted to encode said transaction data according to a predetermined format; and a wireless transceiver in data communication with said encoder, said transceiver being adapted to at least transmit at least portions of said encoded transaction data in the form of radio frequency energy to said second device.

28. The Apparatus of claim 27, wherein said transaction data comprises user annotations, and said data encoder is further adapted to encode said annotations in a form recognizable by said second device.

29. The Apparatus of claim 27, wherein said transaction data encoder is further adapted to encode said data according to one or more transaction classifications.

30. A method of transferring encoded transaction data, comprising:

encoding data relating to at least one vendor/customer transaction at a first location;

transmitting said transaction data to a server device; and transmitting said transaction data to a second location, said second location having data processing apparatus in communication with said server device and adapted for at least reading of said encoded transaction data by said customer.

31. The method of claim 30, wherein said act of transmitting said transaction data to a second location comprises:

requiring said customer to authenticate to said server device; and allowing said customer to access said transaction data and transmit same to said second location only after said authentication is completed.

32. The method of claim 30, wherein said transaction data is accessible to both said vendor and customer after said act of transmitting to said server device is completed.

33. The method of claim 30, wherein said act of encoding comprises classifying at least portions of said transaction data according to one or more predetermined categories.

34. A method of transferring and processing encoded transaction data, comprising:

encoding data relating to at least one vendor/customer transaction at a first location, said act of encoding including encoding one or more customer annotations; and transmitting said encoded transaction data to a second location, said second location having data processing apparatus in communication with said first location and adapted for storing of at least portions of said encoded data based at least in part on said encoded annotations.

35. A method of communicating transaction data, comprising:

receiving said transaction data from a data source;

categorizing said transaction data based on one or more predetermined classifications;

encoding the transaction data into a dataform pattern;

printing the dataform pattern onto a receipt;

reading the dataform pattern from the receipt using a scanning device;

decoding the dataform pattern to derive the categorized transaction data; and storing at least one portion of said decoded transaction data in a different location than other portions of said data based at least in part on said one or more predetermined classifications.

36. A method of communicating transaction data, comprising:

receiving said transaction data from a data source;

categorizing said transaction data based on one or more predetermined classifications;

encoding the transaction data into a dataform pattern;

printing the dataform pattern onto a receipt;

adding at least one user annotation;

reading the dataform pattern and at least one annotation from the receipt using a scanning device;

decoding the dataform pattern to derive the categorized transaction data;

decoding said annotations to produce decoded annotations; and storing the decoded transaction data in a computer database based at least in part on said decoded annotations.

* * * * *

UNITED STATES PATENT AND TRADEMARK OFFICE
CERTIFICATE OF CORRECTION

PATENT NO. : 6,533,168 B1
DATED : March 18, 2003
INVENTOR(S) : Peter N. Ching

It is certified that error appears in the above-identified patent and that said Letters Patent is hereby corrected as shown below:

Column 15,
Line 22, "the invention, the cash register 1001 employs a wired (i.e.," should read
-- the invention, the cash register 801 employs a wired (i.e., --
Line 29, "the RFID chip. A number of different wireless transmission" should read -- an RFID chip may be used. A number of different wireless transmission --
Line 44, "Referring now to FIG. 10, yet another embodiment of the" should read
-- Referring again to FIG. 10, yet another embodiment of the --
Line 47, "register 801 to a PDA or other data processing device 801 at" should read
-- register 801 to a PDA or other data processing device 802 at --
Line 51, "the cash register 801 to a customer's PDA 801 without" should read -- the cash register 801 to a customer's PDA 802 without --

Signed and Sealed this

Twenty-ninth Day of July, 2003

JAMES E. ROGAN
*Director of the United States Patent and Trademark Office*